United States Patent
Seames et al.

(10) Patent No.: US 9,273,252 B2
(45) Date of Patent: Mar. 1, 2016

(54) PRODUCTION OF AROMATICS FROM NONCATALYTICALLY CRACKED FATTY ACID BASED OILS

(75) Inventors: Wayne Seames, Grand Forks, ND (US); Brian Tande, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 737 days.

(21) Appl. No.: 13/453,331

(22) Filed: Apr. 23, 2012

(65) Prior Publication Data
US 2012/0271083 A1 Oct. 25, 2012

Related U.S. Application Data

(60) Provisional application No. 61/478,177, filed on Apr. 22, 2011.

(51) Int. Cl.
*C07C 1/00* (2006.01)
*C10G 3/00* (2006.01)
(Continued)

(52) U.S. Cl.
CPC *C10G 3/49* (2013.01); *C10G 47/20* (2013.01); *C10G 51/04* (2013.01); *C10G 55/04* (2013.01); *C10G 57/005* (2013.01); *C10G 61/04* (2013.01); *C10G 63/04* (2013.01); *C10G 3/00* (2013.01);
(Continued)

(58) Field of Classification Search
CPC ............ C10G 3/00; C10G 3/40; C10G 61/04; C10G 63/04; C10G 2300/305; C10G 2300/1051; C10G 2300/1081; C10G 2300/1041
USPC ..................... 585/240; 44/305, 306
See application file for complete search history.

(56) References Cited

U.S. PATENT DOCUMENTS

| 4,364,745 A | 12/1982 | Weil |
| 4,992,605 A | 2/1991 | Craig et al. |

(Continued)

FOREIGN PATENT DOCUMENTS

| CN | 101457149 A | 6/2009 |
| WO | WO2008039756 A2 | 4/2008 |

(Continued)

OTHER PUBLICATIONS

R. O. Dunn, et al., "Low-Temperature Properties of Triglyceride-Based Diesel Fuels: Transesterified Methyl Esters and Petroleum Middle Distillate/Ester Blends", from JAOCS, vol. 72, No. 8, pp. 895-904 (1995).

(Continued)

*Primary Examiner* — Nina Bhat
(74) *Attorney, Agent, or Firm* — Kinney & Lange, P.A.

(57) ABSTRACT

A method for producing aromatic compounds from fatty acid oils including heating a fatty acid oil to a temperature between about 100° C. to about 800° C. at a pressure between about vacuum conditions and about 200 psia for a time sufficient to crack the oil and produce a cracked fatty acid oil; removing undesired materials, unreacted oil, heavy ends, and light ends from the cracked fatty acid oil; heating the resulting purified cracked fatty acid oil to a temperature between about 100° C. to about 800° C. at a pressure between about vacuum conditions and about 200 psia for a time sufficient to reform alkenes and alkanes in the cracked fatty acid oil into aromatic compounds and produce a reformed fatty acid oil; and extracting components from the reformed fatty acid oil to produce a mixture of chemical products containing between 5% and 90% aromatic compounds by weight.

22 Claims, 3 Drawing Sheets (51) Int. Cl.
*C10G 47/20* (2006.01)
*C10G 51/04* (2006.01)
*C10G 55/04* (2006.01)
*C10G 57/00* (2006.01)
*C10G 61/04* (2006.01)
*C10G 63/04* (2006.01)

(52) U.S. Cl.
CPC .... *C10G 2300/1014* (2013.01); *C10G 2400/08* (2013.01)

(56) References Cited

U.S. PATENT DOCUMENTS

| | | | |
|---|---|---|---|
| 5,233,109 | A | 8/1993 | Chow |
| 5,520,708 | A | 5/1996 | Johnson et al. |
| 5,578,090 | A | 11/1996 | Bradin |
| 5,705,722 | A | 1/1998 | Monnier et al. |
| 5,898,089 | A * | 4/1999 | Drake et al. ............ 585/418 |
| 5,986,133 | A | 11/1999 | Holtzapple et al. |
| 6,284,008 | B1 | 9/2001 | Caprotti |
| 7,014,668 | B2 | 3/2006 | Golubkov et al. |
| 7,041,738 | B2 | 5/2006 | Krull et al. |
| 7,045,100 | B2 | 5/2006 | Ergun et al. |
| 8,076,504 | B2 * | 12/2011 | Kubatova et al. ......... 560/179 |
| 8,450,541 | B2 * | 5/2013 | Seames et al. ........... 585/240 |
| 2003/0093942 | A1 | 5/2003 | Jordan |
| 2003/0167681 | A1 | 9/2003 | Delgado Puche |
| 2004/0074760 | A1 | 4/2004 | Portnoff et al. |
| 2004/0231236 | A1 | 11/2004 | May et al. |
| 2005/0126956 | A1 | 6/2005 | Rangarajan et al. |
| 2005/0232956 | A1 | 10/2005 | Bist et al. |
| 2006/0024801 | A1 | 2/2006 | Holtzapple et al. |
| 2006/0236598 | A1 | 10/2006 | Selvidge |
| 2007/0014895 | A1 | 1/2007 | Holtzapple et al. |
| 2007/0039240 | A1 | 2/2007 | Carroway |
| 2007/0068848 | A1 * | 3/2007 | Monnier et al. ............. 208/15 |
| 2007/0137097 | A1 * | 6/2007 | Ikura ........................... 44/308 |
| 2007/0144060 | A1 | 6/2007 | Ikura |
| 2007/0170091 | A1 | 7/2007 | Monnier et al. |
| 2008/0034645 | A1 | 2/2008 | Bressler |
| 2008/0092436 | A1 | 4/2008 | Seames et al. |
| 2009/0069610 | A1 | 3/2009 | Roberts, IV et al. |
| 2010/0145117 | A1 * | 6/2010 | Seames et al. ........... 585/240 |
| 2010/0296997 | A1 * | 11/2010 | Parker et al. ............. 423/449.9 |
| 2012/0198757 | A1 * | 8/2012 | Koyama ....................... 44/307 |
| 2013/0267744 | A1 * | 10/2013 | Kim et al. ................. 585/251 |

FOREIGN PATENT DOCUMENTS

| | | |
|---|---|---|
| WO | WO2008103204 A2 | 8/2008 |
| WO | 2011012438 A1 | 2/2011 |

OTHER PUBLICATIONS

I. Lee, et al. "Use of Branched-Chain Esters to Reduce the Crystallization Temperature of Biodiesel", from JAOCS, vol. 72, No. 10, pp. 1155-1160 (1995).

S. P. R. Katikaneni, et al., "Catalytic Conversion of Canola Oil to Fuels and Chemicals Over Various Cracking Catalysts", from The Canadian Journal of Chemical Engineering, vol. 73, pp. 484-497 (1995).

M. S. Graboski, et al., "Combustion of Fat and Vegetable Oil Derived Fuels in Diesel Engines," from Prog. Energy Combust. Sci., vol. 24, pp. 125-164 (1998).

F. Ma, et al., "Biodiesel Production: A Review", from Bioresource Technology 70, pp. 1-15 (1999).

R. O. Dunn, "Alternative Jet Fuels From Vegetable Oils", from American Society of Agricultural Engineers, vol. 44, pp. 1751-1757 (2001).

Y. S. Ooi, et al., "Catalytic Conversion of Palm Oil-Based Fatty Acid Mixture to Liquid Fuel", from Biomass and Bioenergy 27, pp. 477-484 (2004).

E. Corporan, et al., "Impacts of Biodiesel on Pollutant Emissions of a JP-8-Fueled Turbine Engine", from Journal of the Air & Waste Management Assoc., vol. 55, pp. 940-949 (Jul. 2005).

S. M. Sadrameli, et al., "Systematics of Renewable Olefins From Thermal Cracking of Canola Oil," from J. Anal. Appl. Pyrolysis 78, pp. 445-451 (2007).

B. K. Bhaskara Rao, "Modern Petroleum Refining Processes", Oxford & IBH Publishing Co. Pvt. Ltd. (5th Ed. 2007) pp. 304-407.

"The Need for Leaded Avgas." EPI Inc. First published Feb. 28, 2008. Retrieved Apr. 28, 2010 from <http://www.epi-eng.com/aircraft_engine_products/demise_of_avgas.htm>.

The PCT International Preliminary Report mailed on Oct. 22, 2013 for International Application No. PCT/US2012/034648.

European Patent Office, Extended European Search Report, Jan. 29, 2015, 10 pages.

* cited by examiner

PRODUCTION OF AROMATICS FROM NONCATALYTICALLY CRACKED FATTY ACID BASED OILS

CROSS-REFERENCE TO RELATED APPLICATION(S)

This application claims priority to U.S. Provisional Application No. 61/478,177, filed on Apr. 22, 2011 and entitled "PRODUCTION OF AROMATICS FROM NONCATALYTICALLY CRACKED FATTY ACID BASED OILS".

STATEMENT OF GOVERNMENT INTEREST

This invention was made with government support under Contract No. 2008-35504-04515 awarded by the United States Department of Agriculture. The government may have certain rights in the invention.

BACKGROUND

One of the key challenges facing modern industrialized society is the rapid depletion of crude oil, which is the primary source for most transportation fuels and many organic chemicals. The petrochemical industry represents a substantial benefit to human society and the invention and commercialization of alternative sources for petrochemicals is of great importance.

One category of organic chemicals that is often produced from petroleum includes aromatics. These chemicals have a wide range of uses including serving as monomers for many types of polymers, paints, and coatings; serving as chemical intermediates for many types of industrial and consumer chemicals; and serving as valuable chemical components of heterogeneous transportation fuels such as gasoline, diesel, aviation gasoline, and jet fuel.

Surprisingly, very little work has been done to develop a method of producing aromatics from renewable sources. Gruber et al. (U.S. Patent Application Publication No. 2009/0299109) describe a method for producing aromatic compounds from cellulosic/hemi-cellulosic/lignin biomass. According to Gruber's method, cellulosic/hemi-cellulosic/lignin biomass is subjected to fermentation with one or more micro-organisms to form one or more $C_2$-$C_6$ alcohols. The alcohols are converted into $C_2$-$C_6$ alkenes by dehydration and then isolated from other compounds. These $C_2$-$C_6$ alkenes are then catalytically reacted to form one or more aromatic hydrocarbons. To date, the only method based on the fermentation of cellulosic/hemi-cellulosic/lignin biomass to alcohols that has been commercialized involves the production of ethanol as a substitute for motor gasoline. Concerns with fermentation through alcohol pathways are the high consumption of water and low overall energy efficiency [Doherty, W. O. S., Mousavioun, P., Fellows, C. M., Value-adding to cellulosic ethanol: Lignin polymers, Industrial Crops and Products, Volume 33, Issue 2, March 2011, Pages 259-276., A. Széchényi, R. Barthos, and F. Solymosi, Aromatization of ethanol on $Mo_2C$/ZSM catalysts, Catalysis Letters Vol. 110, Nos. 1-2, August 2006]. Thus, a need exists to provide an alternative pathway that can provide a source for aromatic chemicals so that demand can be satisfied as the available supply of source material, i.e., crude oil, is depleted while addressing concerns with fermentation through alcohol pathways.

During the scale-up of a process to noncatalytically crack fatty acid based oils including but not limited to crop oils and other triacyl glycerides; fatty acid lipids produced by microbes, fungi, and yeasts; and animal fats, in a continuous reaction system, an unusual cracking reaction product was obtained that has not been documented in previous literature nor was seen during previous batch reaction experiments. This cracking reaction product contains a high concentration of $C_2$-$C_{16}$ alkenes. This unusual result, coupled with subsequent catalytic reforming of these alpha alkenes, is the basis of a new process to generate renewable aromatics from fatty acid oils.

SUMMARY

A method for producing aromatic chemical products from fatty acid oils includes heating a fatty acid oil to a temperature ranging from about 100° C. to about 800° C. at a pressure between about vacuum conditions and about 200 psia and for a time sufficient to crack the fatty acid oil and produce a cracked fatty acid oil; removing undesired materials, unreacted fatty acid oil, heavy ends, and light ends from the cracked fatty acid oil; heating the resulting purified cracked fatty acid oil to a temperature ranging from about 100° C. to about 800° C. at a pressure ranging from vacuum conditions to about 200 psia for a time sufficient to reform alkenes and alkanes in the purified cracked fatty acid oil into aromatics and produce a reformed fatty acid oil; and extracting components from the reformed fatty acid oil to produce a mixture of chemical products containing between 5% and 90% aromatic organic compounds by weight.

A method for producing a high-octane aviation fuel with low lead content includes heating a fatty acid oil to a temperature ranging from about 100° C. to about 800° C. at a pressure ranging from vacuum conditions to about 200 psia for a time sufficient to crack the fatty acid oil and produce a cracked fatty acid oil; removing undesired materials, unreacted fatty acid oil, heavy ends, and light ends from the cracked fatty acid oil; heating the resulting purified cracked fatty acid oil to a temperature ranging from about 100° C. to about 800° C. at a pressure ranging from vacuum conditions to about 200 psia for a time sufficient to reform alkenes and alkanes in the cracked fatty acid oil into aromatic compounds and produce a reformed fatty acid oil; removing undesired materials, unreacted cracked fatty acid oil, heavy ends, and light ends from the reformed fatty acid oil; alkylating the reformed fatty acid oil to produce a mixture of chemical products containing at least about 50% high octane alkylated aromatics by weight to produce an aviation fuel having an octane number of at least 95.

DETAILED DESCRIPTION

Aromatic compounds can be directly produced from fatty acid oils via chemical reaction using a zeolite-based, heterogeneous catalyst as described in U.S. patent application Ser. No. 12/626,304. However, the use of a catalyst to directly convert fatty acid oils to aromatics has the potential to produce unwanted by-products that can reduce the effectiveness of the catalyst and/or reduce the overall conversion yield of feedstock into usable final products. One of these unwanted by-products is coke, which is a carbon-rich solid phase material that can foul heat transfer surfaces, block active catalyst sites, and plug catalyst pores. Another of these unwanted by-products is tar, which is a highly viscous organic liquid that can also cause the abovementioned problems associated with coke. These materials must be removed from a catalytic reactor whenever reaction efficiency drops below an acceptable level. The most common method of removing these materials is to oxidize the coke and tar to carbon dioxide, which then leaves the catalyst in the gas phase. Unfortunately, this method also results in a loss of valuable organic products and increases carbon emissions from the process.

Because of the problems caused by coke and tar formation in catalytic reactions of fatty acid oils, previous development and commercialization has focused on noncatalytic reactions (also known as noncatalytic cracking or thermal cracking) or on hydrotreating reactions for the conversion of fatty acid oils into useful products such as diesel, kerosene, or jet fuel as noted in U.S. Patent Application Publication Nos. 2008/0092436 and 2009/0158537. One disadvantage of hydrotreating reactions is that these reactions do not generate aromatic compounds nor the most commercially viable precursors to aromatics-alkenes. Noncatalytic cracking can generate aromatics directly, but the concentration is too low to isolate and purify aromatic products for commercial use.

The present invention resolves the aforementioned problems. During the scale-up of a process to noncatalytically crack fatty acid oils including but not limited to crop oils and other triacyl glycerides; fatty acid lipids produced by microbes, fungi, algae and yeasts; and animal fats, in a continuous reaction system, an unexpected cracking reaction product was obtained that had not been documented in previous literature nor was seen during previous batch reaction experiments. This reaction product contained a high concentration of alkenes. Based on this discovery, a process was developed that couples the noncatalytic cracking of fatty acid oils under conditions that yield a high concentration of alkenes with the subsequent catalytic reforming of $C_6$-$C_{10}$ length alkenes and alkanes into aromatics. While Gruber teaches the reforming of $C_2$-$C_6$ alkenes to aromatics, no previous work has been found where $C_6$-$C_{10}$ length alkenes have been reformed to aromatics from a heterogeneous mixture.

The integration of multiple processing steps based on the two step reaction process creates valuable chemical products outside the scope of general fatty acid oil processing. One example is the purification of aromatic compounds so that they can be converted into raw materials from which polymers can be made. Another example of additional processing steps that create new products from fatty acid oils utilizes an additional chemical reaction in which aromatic compounds are further reacted with other chemicals to produce alkylated aromatic compounds. These alkylated aromatic compounds can be produced in a mixture that is suitable as a high octane gasoline fuel that can replace petroleum-based gasoline fuel compounds.

Subsequent separation and other processing steps can be used to produce specific aromatic-based products including but not limited to benzene, toluene, o-xylene, p-, m-xylene, ethylbenzene, and/or a mixed aromatics product.

Subsequent alkylation reactions, separation steps, and other processing steps can be used to produce complex aromatic-based products including but not limited to cumene, naphthalene, anthracene and alkylated benzenes. Subsequent separation and other processing steps can be used to produce specific aromatic-based products or other products derived from aromatic hydrocarbons. Alternatively, a mixture of heavier aromatic compounds can be produced that can be used as a high octane gasoline such as a replacement for 100LL aviation gasoline or as a gasoline additive.

"Aromatics," "aromatic compounds" or "aromatic hydrocarbons" are hydrocarbons containing planar sets of six carbon atoms that are connected by delocalized electrons in a manner as if they were connected by alternating single and double covalent bonds. Aromatic compounds include, but are not limited to: benzene, toluene, o-xylene, m-xylene, p-xylene, ethyl benzene, methyl benzene, ethyl methyl benzene, dimethyl benzene, trimethylbenzene, propyl benzene, methyl propyl benzene, tetramethyl benzene, cetyl butenyl benzene, and methyl propyl benzene. Aromatic compounds also include polyaromatics, such as naphthalene, methyl naphthalene, ethyl naphthalene, tetra hydro methyl naphthalene, and tetra hydro ethyl naphthalene.

Embodiments of the present invention are directed to the production and purification of products that contain aromatic compounds from plant oils, biologically generated lipids and animal fats. Specifically, the feedstocks are triacyl glycerides, long chain fatty acids, long chain lipids, or similar chemicals. Embodiments of the present invention provide means to produce aromatics from feedstocks not currently utilized to produce these chemicals. The chemical modifications, based on the use of cracking, chemical reactions, and separation techniques, are designed to produce commercial-quality chemical products that can directly replace comparable chemical products generated from other feedstock sources and to produce fuel blendstocks that are advantageous because of their high concentration of cyclic organic compounds containing aromatic compounds. "Cracking" refers to any process that changes the chemical composition of an organic chemical or chemical mixture by cleaving one or more carbon-carbon bonds.

Applicants discovered that when a cracking reactor product was generated in a noncatalytic reactor at low pressures in a continuous reaction system and then purified to remove light ends, recyclables, and tars, the resulting product contained between 5% and 50% alkenes. Alkenes are known to catalytically reform more efficiently into aromatic compounds than comparably sized alkanes. This purified high alkene cracking reactor product can then be routed to a catalytic reactor where alkenes and some of the alkanes are reformed to aromatic hydrocarbons. Embodiments of the present invention use noncatalytic cracking technologies, coupled with separation technologies such as distillation, filtration, membrane filtration or separation, solvent extraction, and related technologies to produce high concentrations of alkenes from fatty acid oil, coupled with catalytic reforming technologies and additional separation technologies to generate aromatic products. In addition, certain aromatic products and/or products derived from aromatics require additional subsequent chemical reactions. The unique set of noncatalytic reaction conditions that led to the production of a sufficiently high concentration of alkenes that makes these process routes feasible has not been previously reported, demonstrated or used to produce commercial quality cyclic organic compound fuel blendstocks or to produce commercial-quality purified aromatic and/or cycloparaffinic chemical products having between 5% and 90% cyclic organic compounds. Mixtures of aromatic compounds and cycloparaffin products can be produced wherein at least about 20%, 30% or 50% of the mixture are aromatic compounds.

The raw material for the processes presently disclosed can be any fatty acid oil, representing a group of chemical compounds that can be found in plant oils or biomass such as algae, or any medium and/or long chain fatty acids that are naturally synthesized and found in biomass such as algae, animal fats, or modified materials. "Biomass" refers to any organic, non-fossil material that is derived from the mass of any biological organism excluding mass that has been transformed by geological processes in substances such as coal or petroleum. "Fatty acid oil" refers to any oil derived from a biomass source that contains a carboxylic acid group. The fatty acid oils in plant oils consist of three medium and/or long chain fatty (naturally synthesized carboxylic) acids connected via a glycerol group. These medium and/or long chain fatty acids, can be purified, separated, and chemically modified for use as a food source or chemical feedstock or as a potential transportation fuel. "Long chain fatty acids" refer to fatty acid chains containing at least fifteen carbon atoms. "Medium chain fatty acids" refer to fatty acid chains containing ten to fourteen carbon atoms.

"Plant oil" refers to lipids that are derived from plant sources. Plant oils include, but are not limited to oils from cottonseed, flaxseed, soybean, safflower, sunflower, sesame, canola, rapeseed, jatropha, jojoba, evening primrose, poppy, camelina, crambe, olive, coconut, palm, cotton, corn, soybean, and nuts. Compositions of major commercially available crop oils are listed in Table 1. Typical fatty acids contained in crop oils include saturated and unsaturated fatty acids. Saturated fatty acids do not contain any double bonds between carbon atoms. Unsaturated fatty acids contain two or more carbon atoms having a carbon-carbon double bond. Saturated acids include stearic acid, palmitic acid, myristic acid, and lauric acid. Unsaturated acids include linolenic acid, linoleic acid, oleic acid, hexadecanoic acid, palmitoleic acid, and myristoleic acid.

TABLE 1

| Crop Name | Lipid % | Polyunsaturated % 18:3 | 18.2 | 22:1 | Mono % 18:1 | Saturated % 18:0 | 16:0 | Total |
|---|---|---|---|---|---|---|---|---|
| Corn | 4 | — | 59 | — | 24 | 17 | — | 17 |
| Crambe | 26-38 | 5 | 9 | 55-60 | 17 | — | — | 3 |
| Flax | 35 | 58 | 14 | — | 19 | 4 | 5 | 9 |
| Soybean | 20 | 7 | 50 | — | 26 | 3 | 12 | 15 |
| Mid-Oleic Soybean | 20 | 0.5 | 28 | — | 60 | 4 | 9 | 13 |
| Safflower | 59 | — | 75 | — | 13 | 12 | — | 12 |
| Sunflower | 47 | — | 74 | — | 23 | 3-4 | 7 | 10-11 |
| NuSun Sunflower | 45-50 | — | 15-35 | — | 50-75 | 3-4 | 4-5 | 7-9 |
| High Oleic Sunflower | 45-50 | — | 7 | — | 83 | 4 | 5 | 9 |
| Primrose | 17 | — | 81 | — | 11 | 2 | 6 | 8 |
| Sesame | 49.1 | — | 45 | — | 42 | 13 | — | 13 |
| Canola | 30-35 | 8 | 22 | 1 | 64 | 3 | 1 | 4 |
| Rapeseed | 30-35 | 8 | 22 | 30-45 | 19 | 4 | 1 | 5 |
| Olive | 20 | — | 8 | — | 75 | 16 | — | 16 |
| Coconut | 35 | — | 3 | — | 6 | — | 91 | 91 |
| Palm | 35 | — | 2 | — | 13 | — | 85 | 85 |
| Camelina | 31 | 31.2 | 23.1 | 2.8 | 16.8 | 3.0 | 7.8 | 10.8 |

Noncatalytic and catalytic cracking of medium and/or long chain fatty acids, coupled with separation and purification technologies, can produce a mixture of chemicals suitable for use as a fuel or a fuel blendstock, most specifically as components in diesel, kerosene, aviation turbine, and motor gasoline fuels. "Noncatalytic cracking" refers to a cracking process that involves the addition of energy in the form of thermal energy as measured by an increase in the temperature of the substance being cracked in the absence of a catalyst. "Catalytic cracking" refers to a cracking process that uses a catalyst.

In the cracking process, energy is used to break carbon-carbon bonds. Each carbon atom ends up with a single electron and free radicals. Any reactions of the free radicals can lead to various products. It has been shown that medium (ten to fourteen carbon atoms) and long (greater than fifteen carbon atoms) chain fatty acids are compatible with cracking processes, using either noncatalytic or catalytic cracking. These techniques have been used to modify the chemical composition of crop oils or biodiesel.

Figure 1:
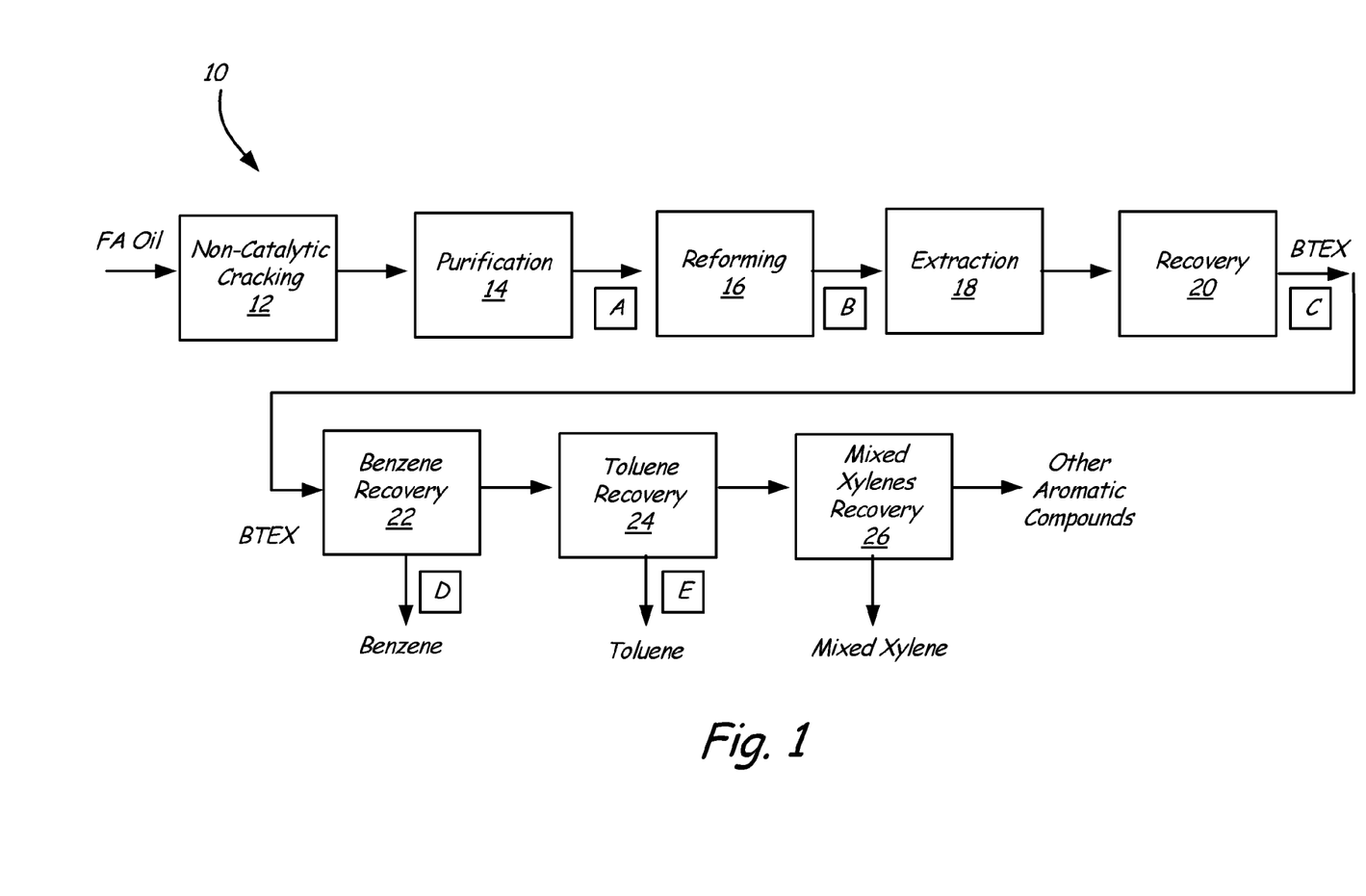
FIG. 1 is a simplified flow diagram illustrating a method for producing aromatics from fatty acid based oil.

FIG. 1 depicts a simplified block flow diagram illustrating one embodiment of a method for producing aromatics according to the present invention. Method 10 utilizes non-catalytic cracking and aromatization processes. The feedstock fatty acid oil is a crop oil, lipid or animal fat feedstock, which can be produced by processes now available or that may be developed in the future. The fatty acid oil may be preheated or directly fed into a suitable vessel (cracking reactor) to facilitate the cracking reactions. The fatty acid oil is cracked in the vessel (step 12). By varying the time, temperature, and pressure under which a particular feedstock remains under cracking conditions, the desired degree of cracking (conversion) can be controlled. Cracking reaction step 12 can be performed between about 100° C. and about 800° C. and at pressure ranging from about vacuum conditions to about 200 psia. More preferably, cracking reaction step 12 is performed between about 300° C. and about 700° C. Conditions are preferably maintained for a time sufficient for fatty acid oil to be cracked, and typically range from about 15 minutes to about 500 minutes or more. Times shorter than 5 minutes and longer than 500 minutes can be suitable for cracking reactions of some feedstocks. Catalysts are not used in cracking step 12. Suitable reactor types for cracking step 12 include batch, continuous flow through, flow through packed bed, and fluidized bed.

The key discovery leading to this method was an unexpected composition obtained in the cracking reactor outlet product, known as crackate, when the cracking step was performed in a low pressure continuous reactor. As shown in Table 2, low pressure non-catalytic cracking results in a crackate containing a much higher concentration of alkenes (alkenes) than non-catalytic cracking performed under higher pressure conditions.

TABLE 2

Comparison of Crackate Concentrations at Different Reaction Pressures

| Cracking Condition | 50 psig, 420° C. | 200 psig, 420° C. | 400 psig, 420° C. |
|---|---|---|---|
| Crackate Yield (wt %) | 72 | 86 | 94 |
| Concentration (wt %) | | | |
| Linear/Branched Alkanes | 6.1 | 12.8 | 8.8 |
| Alkenes | 36.1 | 7.9 | 5.6 |
| Cyclic Paraffins | 3.2 | 1.9 | 1.5 |
| Aromatics | 20.0 | 4.4 | 2.9 |
| Fatty Acids | 1.7 | 11.3 | 11.6 |
| Other | 1.0 | 10.2 | 8.7 |
| Unresolved/Unrecovered | 31.8 | 51.5 | 60.8 |

The products resulting from cracking reaction step 12 are dependent upon the cracking conditions, the original composition of fatty acid oil and the gaseous environment present in the cracking reactor. The cracking conditions can be varied based on detailed chemical analyses in order to produce an optimal mixture of chemical components within the cracked fatty acid oil.

The crackate is subjected to purification step 14. The output from the cracking reactor depends upon the specific reactor design employed and the cracking conditions of cracking step 12. Suitable reactor types for purification step 14 include batch, continuous flow through, flow through packed bed, and fluidized bed. Purification step 14 isolates an alkene-rich organic liquid from other materials produced in the cracking reactor during cracking step 12. Other materials include residual materials or residue, middle distillates, light ends and unreacted raw materials.

Following purification step 14, the alkene-rich organic liquid may be processed to change its temperature and/or to vary the pressure to which it is exposed. The alkene-rich organic liquid is fed to a reforming reactor. Reforming step 16 converts some of the alkenes into aromatics to generate an aromatics-rich liquid. During reforming step 16, the alkene-rich organic liquid is maintained at a temperature ranging from about 100° C. to about 800° C. at a pressure ranging from vacuum conditions to about 200 psia for a time sufficient to reform alkenes and alkanes in the cracked fatty acid oil into aromatic compounds. More preferably, reforming reaction step 16 is performed between about 300° C. and about 550° C. A catalyst can be used to facilitate the reforming reactions in reforming step 16. The catalyst chosen can include one of the following: alumina-based zeolite catalysts such as ZSM-5, beta zeolite, zeolite Y, and others, alumina, silica-alumina, sulfated metal oxides, palladium, niobium, molybdenum, platinum, titanium, aluminum, cobalt, gold, or any other material that can enhance the reforming reactions. A variety of catalyst supports may used. It is also sometimes preferable for these catalysts to be doped with other materials.

The aromatics-rich liquid resulting from reforming step 16 can be concentrated by methods such as distillation or isolated from other organic chemicals present by methods such as solvent extraction, membrane separation, etc. in optional solvent extraction step 18 and/or recovery step 20. In one embodiment of the present invention, solvent extraction step 18 is used to remove aromatic compounds from the aromatics-rich liquid into an aromatics-rich solvent stream. The aromatic compounds can be recovered from the aromatics-rich solvent stream in recovery step 20 by recovery methods such as stripping or distillation to produce a mixed aromatics stream that primarily contains benzene, toluene, ethylbenzene and xylenes (BTEX). The recovery methods utilized can depend upon the specific solvent employed in recovery step 20.

Optional sequential purification steps 22, 24 and 26 such as distillation can be used to generate commercial purity quality aromatic products benzene (step 22), toluene (step 24), and mixed xylenes (step 26). In one embodiment, the mixed xylenes can be further separated into an m-xylene product and a o-, p-xylene product. Alternatively, the xylenes can be left in a heavier aromatics stream. In another embodiment, ethylbenzene and/or other heavier aromatics can be recovered from the heavier aromatics stream by distillation or other methods. The heavier aromatics stream can be used in transportation fuel products such as diesel, kerosene, and gasoline.

The aromatic compounds produced by the present invention can be blended with a primary fuel stream to provide a fuel blend with an increased octane number or reduced lead content. Suitable primary fuel streams include alkylate (gasoline without additives), aviation gasoline blendstock, finished aviation gasoline product, motor gasoline blendstock, and finished motor gasoline product. For example, 100LL aviation gasoline normally contains tetra-ethyl lead (TEL). The maximum lead content for 100LL aviation gasoline is 0.56 grams per liter (2 grams per U.S. gallon). Aromatic compounds can be produced using the present invention and blended with conventional aviation gasoline to provide a 100-octane aviation gasoline containing significantly lower maximum levels of lead (less than about 0.39 grams per liter) than 100LL aviation gasoline. According to the present invention, a mixture of aromatic compounds can be produced that can directly replace current aviation gasoline products (as described in Examples 2 and 3 below). A series of examples are described to demonstrate ways that the present invention can be utilized. These represent examples and are not an exhaustive list of all of the various options and applications for which the present invention can be utilized. Rather, these represent examples of the general classes of applications currently anticipated for the present invention.

EXAMPLE 1

Generating Commercial Grade Benzene and Toluene Products and an Aromatic-Rich Blendstock for Jet Fuel One embodiment of the present invention produces commercial-quality benzene and/or toluene using the process steps shown in FIG. 1. Method 10 yields a benzene end product that meets the purity requirements needed for Refined Benzene-545 per ASTM International (ASTM) Test Method D 4734-04 ( 99.9% benzene by weight per ASTM D 4492). Method 10 also yields a toluene end product that meets the purity requirements needed for Toluene Diisocyanate (TDI) Feedstock per ASTM D 5606-01 (99.9% toluene by weight per ASTM D 2360 or D 6526). The toluene end product can also meet the purity requirements needed for Nitration Grade Toluene specification ASTM D 841-10 [as per ASTM D6526 test method]. The compositions (in volume %) of the different streams labeled A, B, C, D and E in FIG. 1 are shown in Table 3.

TABLE 3

The compositions (% volume) of streams in FIG. 1

| Component | Stream A | Stream B | Stream C | Stream D | Stream E |
|---|---|---|---|---|---|
| Benzene | <1 | 1.0 | 4.8 | — | — |
| Toluene | <1 | 5.8 | 29 | 30 | — |
| Ethylbenzene | <1 | 2.4 | 12 | 13 | 18 |
| p-xylene | <1 | 8.3 | 41 | 43 | 62 |
| o-xylene | <1 | 2.6 | 13 | 14 | 20 |
| Alkanes | 23 | — | — | — | — |
| Alkenes | 11 | — | — | — | — |
| Fatty acids | 22 | — | — | — | — |
| Other Compounds | 43 | 79.9 | — | — | — |

EXAMPLE 2

Generating a 100 Octane Unleaded Aviation Gasoline

Figure 2:
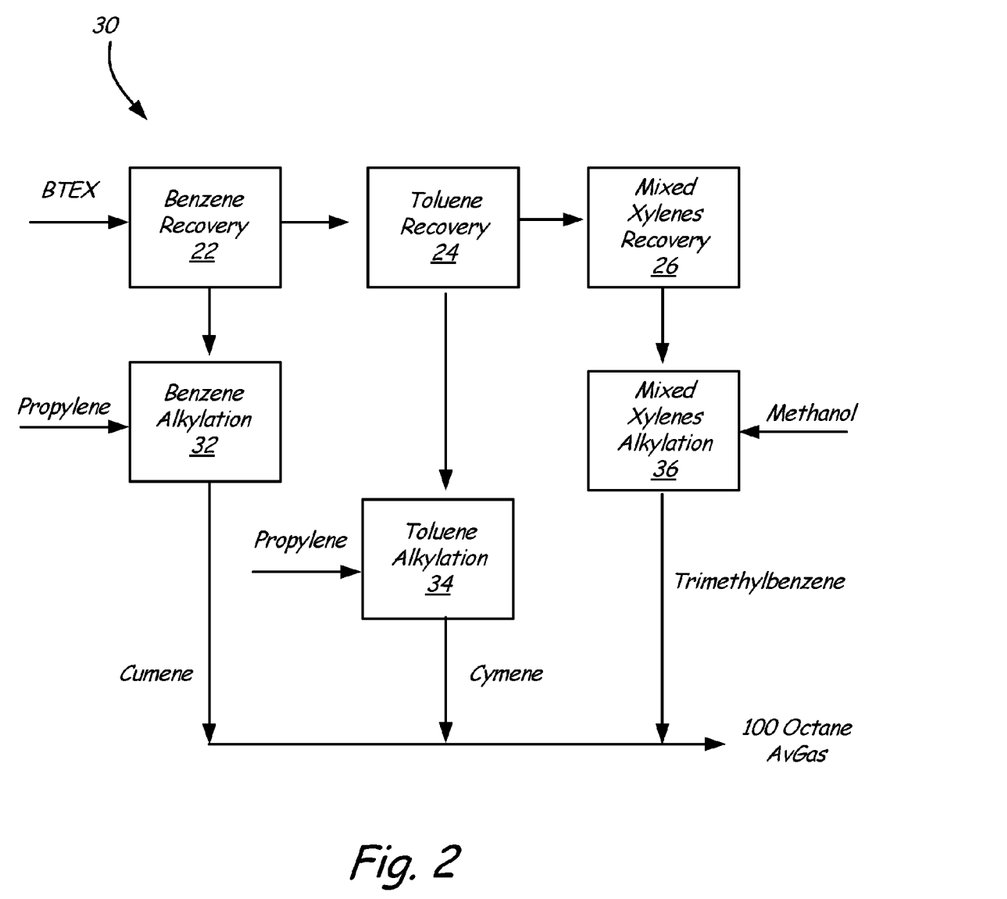
FIG. 2 is a simplified flow diagram illustrating one embodiment of a method for producing an aviation gasoline from fatty acid oil.

Another embodiment of the present invention produces a high octane unleaded aviation gasoline to replace current 100LL AvGas. The process is depicted in FIG. 2 (method 30), which illustrates steps following optional concentration step 20. The descriptions provided in paragraphs [0026] through [0033] above are applicable to this embodiment. Following the sequential purification processes (steps 22, 24 and 26) each of the respective primary aromatic products (benzene, toluene and mixed xylenes) is routed to an alkylation reactor. Benzene and toluene are reacted with propylene in benzene alkylation step 32 and toluene alkylation step 34 in separate alkylation reactors to produce cumene and cymene, respectively. The mixed xylenes are reacted with methanol in mixed xylenes alkylation step 36 to generate trimethyl benzene. The resulting cumene, cymene and trimethyl benzene streams are then blended together to produce an aviation gasoline product containing at least about 50% high octane alkylated aromatics by weight and having an octane number of at least 95, and more preferably, around 100. The properties of the alkylated compounds and the final aviation gasoline product are shown in Table 4 (Blend CCT).

TABLE 4

Estimated Properties of Alkylated Aromatics and Blends for Aviation Gasoline

| | Composition (wt %) | Octane Number | Flash Point (° C.) | Freeze Point (° C.) | Energy Density (MJ/kg) |
|---|---|---|---|---|---|
| Isopropylbenzene (cumene) | 14 | 14 | 6 | −13 | 6 |
| Methylisopropylbenzene (cymene) | 40 | 39 | 20 | −28 | 17 |
| Dimethylisopropylbenzene (DMIPB) | 46 | 44 | 30 | −35 | 19 |
| Trimethylbenzene (TMB) | 46 | 51 | 52 | −20 | 19 |
| Blend CCD[1] | 100 | 96 | 56 | −75 | 41.5 |
| Blend CCT[2] | 100 | 103 | 79 | −61 | 41.2 |

[1]A blend of 17% cumene, 17% cymene and 66% DMIPB
[2]A blend of 17% cumene, 17% cymene and 66% TMB

EXAMPLE 3

Generating a 96 Octane Unleaded Aviation Gasoline

Figure 3:
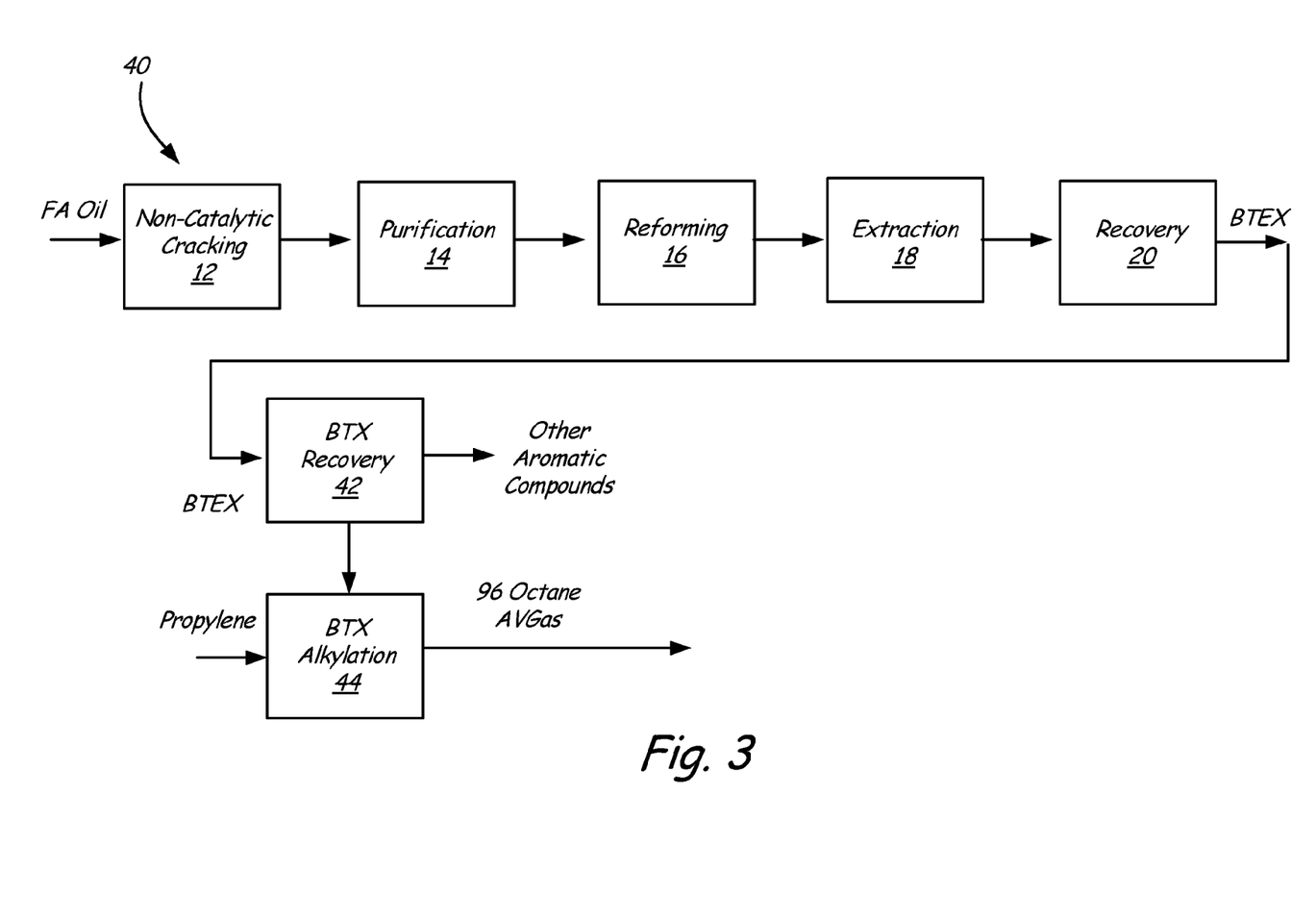
FIG. 3 is simplified flow diagram illustrating another embodiment of a method for producing an aviation gasoline from fatty acid oil.

In another embodiment of the present invention, an alternative high octane unleaded aviation gasoline is produced. This process (method 40) is depicted in FIG. 3. A stream with a high aromatics concentration is generated according to process steps 12, 14, 16, 18 and 20, described above. Benzene, toluene, and xylene (BTX) are isolated from other compounds present in the high aromatics stream by methods such as distillation in BTX recovery step 42. The resulting BTX stream is routed to an alkylation reactor where it is alkylated with propylene in alkylation step 44 to produce a mixture of cumene, cymene, and dimethylisopropylbenzene. This mixed stream is an aviation gasoline product having an octane number of around 96. The properties of the alkylated compounds and the final aviation gasoline product are shown in Table 4 (Blend CCD).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method for producing aromatic compounds from fatty acid oil, the method comprising:

heating a fatty acid oil in a reactor vessel to a temperature ranging from about 100° C. to about 800° C. at a pressure ranging from vacuum conditions to about 200 psia for a time sufficient to noncatalytically crack the fatty acid oil and produce a cracked fatty acid oil;

removing undesired materials, unreacted fatty acid oil, heavy ends, and light ends from the cracked fatty acid oil to produce a purified cracked fatty acid oil;

heating the purified cracked fatty acid oil in a second reactor vessel to a temperature ranging from about 100° C. to about 800° C. at a pressure ranging from vacuum conditions to about 200 psia for a time sufficient to reform alkenes and alkanes in the purified cracked fatty acid oil into aromatic compounds and produce a reformed fatty acid oil; and extracting components from the reformed fatty acid oil to produce a mixture of chemical products containing between 5% and 90% aromatic compounds by weight.

2. The method of claim 1, wherein the mixture of chemical products contains 20% or more aromatic compounds.

3. The method of claim 2, wherein the mixture of chemical products contains 30% or more aromatic compounds.

4. The method of claim 3, wherein the mixture of chemical products contains 50% or more aromatic compounds.

5. The method of claim 1, further comprising:
reacting the reformed fatty acid oil to add functional groups to the aromatic compounds in the reformed fatty acid oil before extracting components from the reformed fatty acid oil.

6. The method of claim 5, wherein the step of reacting the reformed fatty acid oil is selected from the group consisting of decarboxylation, alkylation, hydrogenation and combinations thereof.

7. The method of claim 1, further comprising:
reacting the mixture of chemical products extracted from the reformed fatty acid oil to add functional groups to one or more of the aromatic compounds in the mixture of chemical products extracted from the reformed fatty acid oil.

8. The method of claim 7, wherein reacting the mixture of chemical products extracted from the reformed fatty acid oil is selected from the group consisting of decarboxylation, alkylation, hydrogenation and combinations thereof.

9. The method of claim 1, wherein extracting components from the reformed fatty acid oil is selected from the group consisting of solvent extraction, distillation, evaporation, membrane separation, chemical reaction and combinations thereof.

10. The method of claim 1, further comprising:
purifying the mixture of chemical products extracted from the reformed fatty acid oil to produce a product meeting ASTM standards, wherein the product is selected from the group consisting of benzene, toluene, cumene, o-xylene, p-xylene, m-xylene, mixed xylenes, and ethylbenzene.

11. The method of claim 1, wherein the fatty acid oil is selected from a group consisting of plant oil, biologically generated lipid, animal fat and combinations thereof.

12. The method of claim 11, wherein the plant oil is selected from a group consisting of soybean oil, canola oil, palm oil, sunflower oil, corn oil, flaxseed oil, jatropha oil, jojoba oil, cottonseed oil, safflower oil, crambe oil, evening primrose oil, sesame oil, rapeseed oil, olive oil, coconut oil, camelina and combinations thereof.

13. The method of claim 1, wherein the fatty acid oil is heated to a temperature between about 300° C. and about 700° C.

14. The method of claim 1, wherein the fatty acid oil is heated for a time ranging from about 5 minutes to about 500 minutes.

15. The method of claim 1, wherein the fatty acid oil is heated in a gaseous environment.

16. The method of claim 15, wherein the gaseous environment is selected from the group consisting of an inert gas, nitrogen, water vapor, hydrogen, a mixture of vapor-phase organic chemicals and combinations thereof.

17. The method of claim 1, wherein a catalyst is added to the second reaction vessel.

18. The method of claim 17, wherein the catalyst is selected from the group consisting of doped or undoped versions of the following: alumina-based zeolite catalysts such as ZSM-5, beta zeolite, zeolite Y, and others, alumina, silica-alumina, sulfated metal oxides, palladium, niobium, molybdenum, platinum, titanium, aluminum, cobalt, gold, or other metals and combinations thereof.

19. The method of claim 1, wherein the aromatic compounds comprise at least 50% toluene or benzene by weight.

20. The method of claim 1, further comprising:
processing the aromatic compounds to remove solvents or purify the aromatic compounds.

21. A method for producing a high-octane aviation fuel with low lead content, the method comprising:
heating a fatty acid oil in a reactor vessel to a temperature ranging from about 100° C. to about 800° C. at a pressure ranging from vacuum conditions to about 200 psia for a time sufficient to crack the fatty acid oil and produce a cracked fatty acid oil;
removing undesired materials, unreacted fatty acid oil, heavy ends, and light ends from the cracked fatty acid oil to produce a purified cracked fatty acid oil;
heating the purified cracked fatty acid oil in a second reactor vessel to a temperature ranging from about 100° C. to about 800° C. at a pressure ranging from vacuum conditions to about 200 psia for a time sufficient to reform alkenes and alkanes in the cracked fatty acid oil into aromatic compounds and produce a reformed fatty acid oil;
removing undesired materials, unreacted cracked fatty acid oil, heavy ends, and light ends from the reformed fatty acid oil;
alkylating the aromatics in the reformed fatty acid oil in a third reactor vessel to produce a mixture containing at least about 50% high octane alkylated aromatics by weight and having an octane number of at least 95.

22. The method of claim 21, wherein the mixture containing at least about 50% high octane alkylated aromatics is blended with a fuel having an octane number below 95 to produce an aviation fuel having an octane number of at least 95, and wherein the aviation fuel contains lead at a concentration less than about 0.5 grams per liter.

* * * * *